(12) United States Patent
Rose et al.

(10) Patent No.: US 7,410,202 B2
(45) Date of Patent: Aug. 12, 2008

(54) FLAT CONTROL ELEMENT FOR CONTROLLING A VEHICLE COMPONENT

(75) Inventors: Kai Christen Rose, Berlin (DE); Arne Stoschek, Palo Alto, CA (US)

(73) Assignees: Volkswagen AG, Wolfsburg (DE); Volkswagen of America, Inc., Auburn Hills, MI (US)

( * ) Notice: Subject to any disclaimer, the term of this patent is extended or adjusted under 35 U.S.C. 154(b) by 111 days.

(21) Appl. No.: 11/348,418

(22) Filed: Feb. 6, 2006

(65) Prior Publication Data

US 2007/0182215 A1    Aug. 9, 2007

(51) Int. Cl.
*B60J 5/04* (2006.01)

(52) U.S. Cl. .............................. 296/146.2; 296/146.16; 49/502; 200/61.71

(58) Field of Classification Search .............. 296/146.2, 296/146.16; 49/502; 200/61.71
See application file for complete search history.

(56) References Cited

U.S. PATENT DOCUMENTS

| 4,791,252 | A | * | 12/1988 | Mayer | 200/52 R |
| 5,085,106 | A | * | 2/1992 | Bubnash | 74/335 |
| 5,760,554 | A | * | 6/1998 | Bustamante | 318/280 |
| 5,864,105 | A | * | 1/1999 | Andrews | 200/5 R |
| 5,910,009 | A | | 6/1999 | Leff et al. | |
| 5,952,630 | A | * | 9/1999 | Filion et al. | 200/5 R |
| 6,104,101 | A | * | 8/2000 | Miller et al. | 307/10.1 |
| 6,157,372 | A | * | 12/2000 | Blackburn et al. | 345/173 |
| 6,483,054 | B2 | * | 11/2002 | Suzuki et al. | 200/61.44 |
| 7,002,089 | B2 | * | 2/2006 | Stevenson | 200/512 |
| 7,102,623 | B2 | * | 9/2006 | Morath | 345/173 |
| 7,260,454 | B2 | * | 8/2007 | Pickering et al. | 701/2 |
| 2004/0145327 | A1 | | 7/2004 | Gruber et al. | |
| 2007/0151835 | A1 | * | 7/2007 | Rakers et al. | 200/313 |
| 2007/0202765 | A1 | * | 8/2007 | Krans et al. | 442/301 |

FOREIGN PATENT DOCUMENTS

| DE | 197 52 774 C2 | 6/1999 |
| DE | 198 48 941 C2 | 5/2000 |
| DE | 101 01 004 A1 | 7/2002 |
| DE | 102 06 968 A1 | 8/2003 |
| GB | 2418741 | * 4/2006 |
| WO | WO 00/72239 A1 | 11/2000 |
| WO | WO 02/052391 A2 | 7/2002 |
| WO | WO 2004/048726 A2 | 6/2004 |

* cited by examiner

*Primary Examiner*—Dennis H Pedder
(74) *Attorney, Agent, or Firm*—Manfred Beck, P.A.

(57) ABSTRACT

A substantially flat control element for controlling a vehicle component has touch-sensitive regions and is configured to generate control signals for moving the vehicle component into respective end positions in response to a first and a third one of the touch-sensitive regions of the control element being touched. A second region of the control element has subregions for allowing a variable adjustment of the vehicle component into intermediate positions between the end positions.

8 Claims, 6 Drawing Sheets

FLAT CONTROL ELEMENT FOR CONTROLLING A VEHICLE COMPONENT

BACKGROUND OF THE INVENTION

Field of the Invention

The invention relates to a substantially flat control element for intuitively controlling and adjusting a vehicle component such as a window or a sliding roof.

Conventional power windows for motor vehicles generally use toggle switches for controlling the process of opening and closing the windows. Typically these toggle switches have two switch positions wherein one of the switch positions allows the operator to open i.e. lower a window and the other switch position allows the operator to close, i.e. raise the window. If the operator wishes to have the window only partially open, then the operator can adjust the position of the window glass by pressing or pulling the toggle switch for a period of time wherein the period of pressing or pulling the toggle switch determines the position of the window.

A disadvantage of using a toggle switch in the above-described manner is that a precise adjustment of the position of the window is difficult because it requires the operator to perform a precisely timed actuation of the toggle switch. If the operator actuates the toggle switch for a period that is too long or too short, then the window moves too far or not far enough. In this case, the operator has to adjust the position of the window by actuating the toggle switch again. The operator may even have to repeatedly actuate the toggle switch and move the window repeatedly up and down until the window is in the desired position. Such an operation is disadvantageous especially when the operator is driving and should be concentrating on the traffic rather than on raising and lowering the window.

In order to make it easier to raise or lower power windows of a motor vehicle to a desired position, German Patent No. DE 198 48 941 C2 discloses a control for power windows of a motor vehicle which uses a rotary switch for adjusting a position of a window. The rotary switch has latch positions at given rotary angles and has a neutral position into which the rotary switch springs back after being actuated. Each rotary angle of a respective latch position of the rotary knob corresponds to a given displacement distance for the window. The relationship between the rotary angles and the displacement distances is such that the displacement distance of the window increases in a nonlinear manner with the rotary angle of the rotary knob. This allows an easy adjustment of the window position.

A disadvantage of the rotary switch as well as the toggle switch is that they must be constructed in a robust manner and must be mounted in a mechanically stable position because switches for power windows must be able to endure frequent use over the lifetime of a vehicle. These requirements regarding mechanical stability result in constrictions with regard to the mounting positions, switch geometries, and production technologies. A further disadvantage of the above-described switches is that it is expensive to make the switches aesthetically pleasing because their color, surface finish, style and so forth must be matched to the materials in the vicinity of the mounting position of the switch and to the color and style of other switches in the vehicle. Another disadvantage of the above-described switches is that they include a number a mechanical and electrical components which not only increase their complexity and cost but also means an increase in the overall vehicle weight because a number of those switches are used in a vehicle.

SUMMARY OF THE INVENTION

It is accordingly an object of the invention to provide a control element for controlling a vehicle component which overcomes the above-mentioned disadvantages of the heretofore-known control elements of this general type and which provides an intuitive control operation and makes it simple for an operator to precisely control the vehicle component and which is cost-efficient to manufacture and has an aesthetically pleasing appearance.

With the foregoing and other objects in view there is provided, in accordance with the invention, a vehicle configuration, including:

a vehicle component configured to move between a first position and a second position;

a control element for controlling the vehicle component, the control element having a substantially flat, touch-sensitive first region, a substantially flat, touch-sensitive second region, and a substantially flat, touch-sensitive third region;

the control element being configured to generate a control signal for moving the vehicle component into the first position in response to the first region of the control element being touched;

the second region of the control element having subregions for allowing a variable adjustment of the vehicle component into intermediate positions between the first position and the second position, the control element being configured to generate a control signal for moving the vehicle component into a given intermediate position between the first position and the second position in response to a given one of the subregions of the second region of the control element being touched;

the subregions of the second region of the control element being positioned with respect to one another such that adjacent ones of the subregions of the second region of the control element when being touched cause the vehicle component to move into corresponding adjacent intermediate positions between the first position and the second position; and the control element being configured to generate a control signal for moving the vehicle component into the second position in response to the third region of the control element being touched.

An advantage of the above-defined control element is that, due to its flat shape, the touch-sensitive regions can be intuitively recognized as a representation of corresponding positions of a vehicle component such as a side window or a sliding roof. Further, since the touch-sensitive region that controls intermediate positions of the vehicle component has subregions, it is possible to precisely adjust the position of the vehicle component with a single touch. For example, an operator can raise or lower a side window precisely to a desired position with a single touch. Further, an operator can slide a finger over the touch-sensitive region in order to control the vehicle component in a precise manner. A further advantage of the flat control element is that, unlike conventional switches, it does not require a mechanically stable mounting position and therefore can be attached to almost any surface.

According to another feature of the invention, the vehicle component has a peripheral region; and the first, second and third regions of the control element are disposed adjacent to the vehicle component and extend along the peripheral region of the vehicle component when the vehicle component is in the first position. An advantage of placing the control element right next to the vehicle component to be controlled is that the operation of the control element becomes more intuitive.

According to yet another feature of the invention, the vehicle component is a window glass configured to open and close a window opening by moving between the first position corresponding to a closed position and the second position corresponding to an opened position; the first region of the control element extends along at least a portion of an upper edge of the window opening; the second region of the control element extends substantially entirely along a side edge of the window opening; and the third region of the control element is disposed adjacent a lower edge of the window opening.

According to a further feature of the invention, a window frame holds the window glass and defines the window opening; and at least the first and the second region of the control element are disposed on the window frame.

According to another feature of the invention, the first, second and third regions form a substantially flat continuous band circling entirely around the window opening. This makes it easier to reach the control element. If the control element circles for example a front side window then even a passenger sitting in the rear of the vehicle can reach the control element and open or close the front side window.

According to yet another feature of the invention, a vehicle roof portion is disposed adjacent the window opening; and the first region of the control element is disposed above the window opening on an inner side of the vehicle roof portion.

According to a further feature of the invention, a vehicle A-pillar is disposed adjacent the window opening; and the second region of the control element is disposed on the vehicle A-pillar.

According to yet a further feature of the invention, a vehicle A-pillar is disposed adjacent the window opening; and the vehicle A-pillar has a bottom region and the third region of the control element is disposed at the bottom region of the vehicle A-pillar. The above-defined embodiments are for example advantageous if the vehicle roof and the A-pillar are easy to reach for the driver.

According to another feature of the invention, a pictogram is disposed on each of the first, second and third regions of the control element, the pictogram indicating a control function of a respective one of the first, second and third regions of the control element. This improves the intuitive operation of the control element.

According to a further feature of the invention, a vehicle roof has a roof opening formed therein; the vehicle component is a sliding roof panel configured to open and close the roof opening by moving between the first position corresponding to a closed position and the second position corresponding to an opened position; and the second region of the control element is disposed between the first region and the third region of the control element. Putting the first, second and third region in the above-defined positional relationship, which corresponds to a closed, partially opened and fully opened roof, makes it easy for the operator to realize that the first, second and third regions of the flat control element correspond to the various positions of the roof panel.

According to another feature of the invention, the control element has a further region disposed between the first region and the second region of the control element; and the control element is configured to generate a control signal for moving the sliding roof panel into a tilted position in response to the further region of the control element being touched.

According to another feature of the invention, the sliding roof panel has an adjustable transparency; the control element has a further region for variably adjusting the transparency of the sliding roof panel; the further region of the control element has subregions, the control element being configured to generate a control signal for variably adjusting the transparency of the sliding roof panel in response to a given one of the subregions of the further region of the control element being touched; and the subregions of the further region of the control element being positioned with respect to one another such that adjacent ones of the subregions of the further region of the control element when being touched sequentially cause the transparency of the sliding roof panel to be changed by a minimum amount.

According to another feature of the invention, the sliding roof panel has an adjustable transparency; the control element has further regions for adjusting the transparency of the sliding roof panel; a first one of the further regions of the control element is disposed adjacent the first region of the control element and the control element is configured to generate a control signal for adjusting the transparency to a minimum transparency in response to the first one of the further regions of the control element being touched; a second one of the further regions of the control element is disposed adjacent the second region of the control element and the control element is configured to generate a control signal for variably adjusting the transparency of the sliding roof panel to an intermediate transparency wherein the intermediate transparency depends on where the second one of the further regions of the control element is being touched; and a third one of the further regions of the control element is disposed adjacent the third region of the control element and the control element is configured to generate a control signal for adjusting the transparency to a maximum transparency in response to the third one of the further regions of the control element being touched. Positioning the various regions of the control element in the above-defined manner allows a logical control of two separate functions of the roof panel.

According to yet another feature of the invention, the control element includes a flexible fabric configured to lie flat against a curved surface and the substantially flat, touch-sensitive first, second and third regions of the control element are formed by the flexible fabric. By using a flexible fabric the control element can be mounted in an aesthetically pleasing manner on practically any surface of the interior of the vehicle.

With the objects of the invention in view there is also provided, a vehicle configuration, including:

a vehicle roof having a roof opening formed therein;

a roof panel having an adjustable transparency;

a control element having a substantially flat, touch-sensitive first region, a substantially flat, touch-sensitive second region, and a substantially flat, touch-sensitive third region;

the control element being configured to generate a control signal for adjusting the transparency of the roof panel to a minimum transparency in response to the first region of the control element being touched;

the second region of the control element having subregions for variably adjusting the transparency of the roof panel to an intermediate transparency, the control element being configured to generate a control signal for variably adjusting the transparency of the roof panel to an intermediate transparency in response to a given one of the subregions of the second region of the control element being touched, the intermediate transparency being greater than the minimum transparency and smaller than a maximum transparency of the roof panel, the subregions of the second region of the control element being positioned with respect to one another such that adjacent ones of the subregions of the second region of the control element when being touched sequentially cause the transparency of the sliding roof panel to be changed by a minimum amount; and the control element is configured to generate a control signal for adjusting the transparency of the roof panel to a maximum transparency in response to the third region of the control element being touched.

Other features which are considered as characteristic for the invention are set forth in the appended claims.

Although the invention is illustrated and described herein as embodied in a control element for controlling a vehicle component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
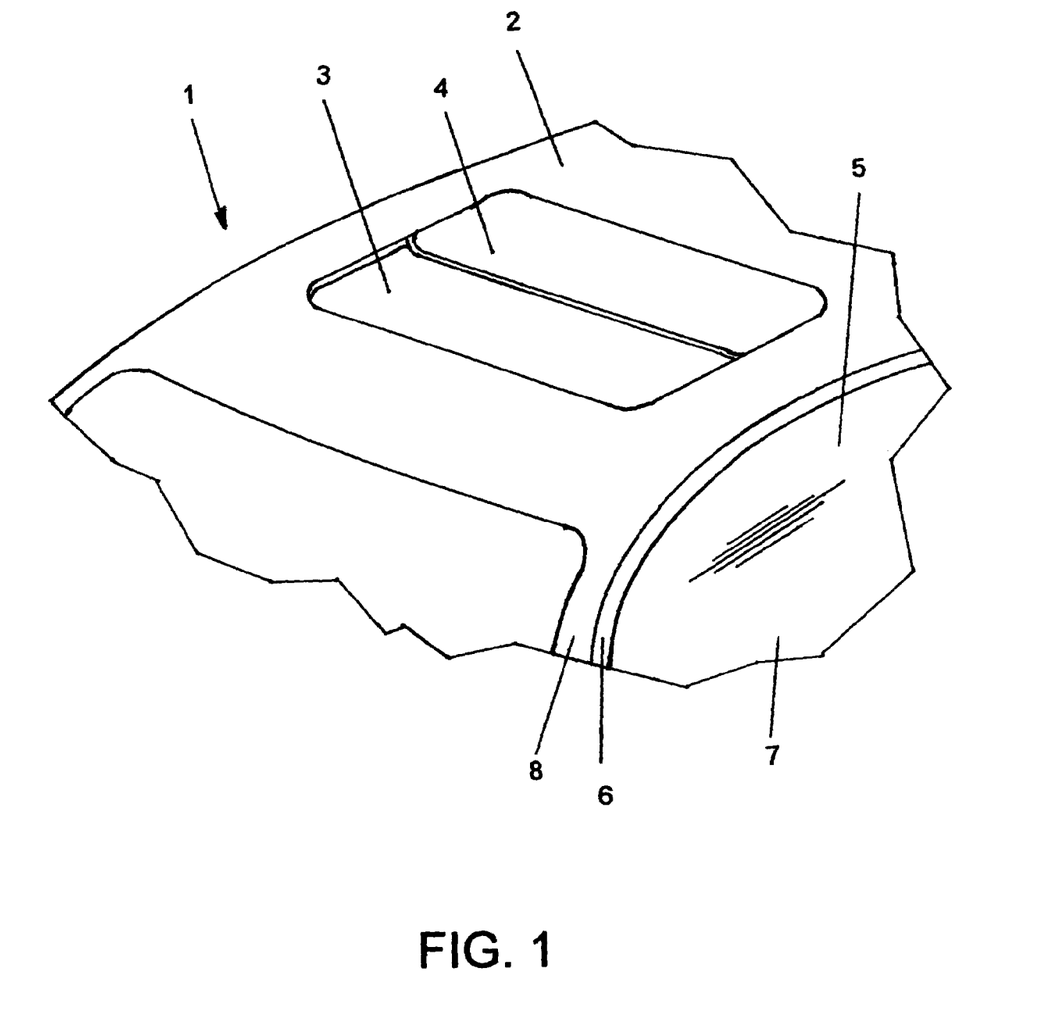
FIG. 1 is a diagrammatic perspective partial view of a motor vehicle having a sliding roof panel and a window which can be controlled by a control element according to the invention.

Referring now to the figures of the drawings in detail and first, particularly, to FIG. 1 thereof, which is a diagrammatic perspective partial view of a motor vehicle 1 having a roof 2 with a roof opening 3. A sliding roof panel 4 opens and closes the roof opening 3. The roof panel 4 can slide back and forth and can also be brought into a tilted position. The motor vehicle 1 further has a side window 5 with a window frame 6 and a window glass 7. FIG. 1 further shows the A-pillar 8 of the motor vehicle 1.

Figure 2:
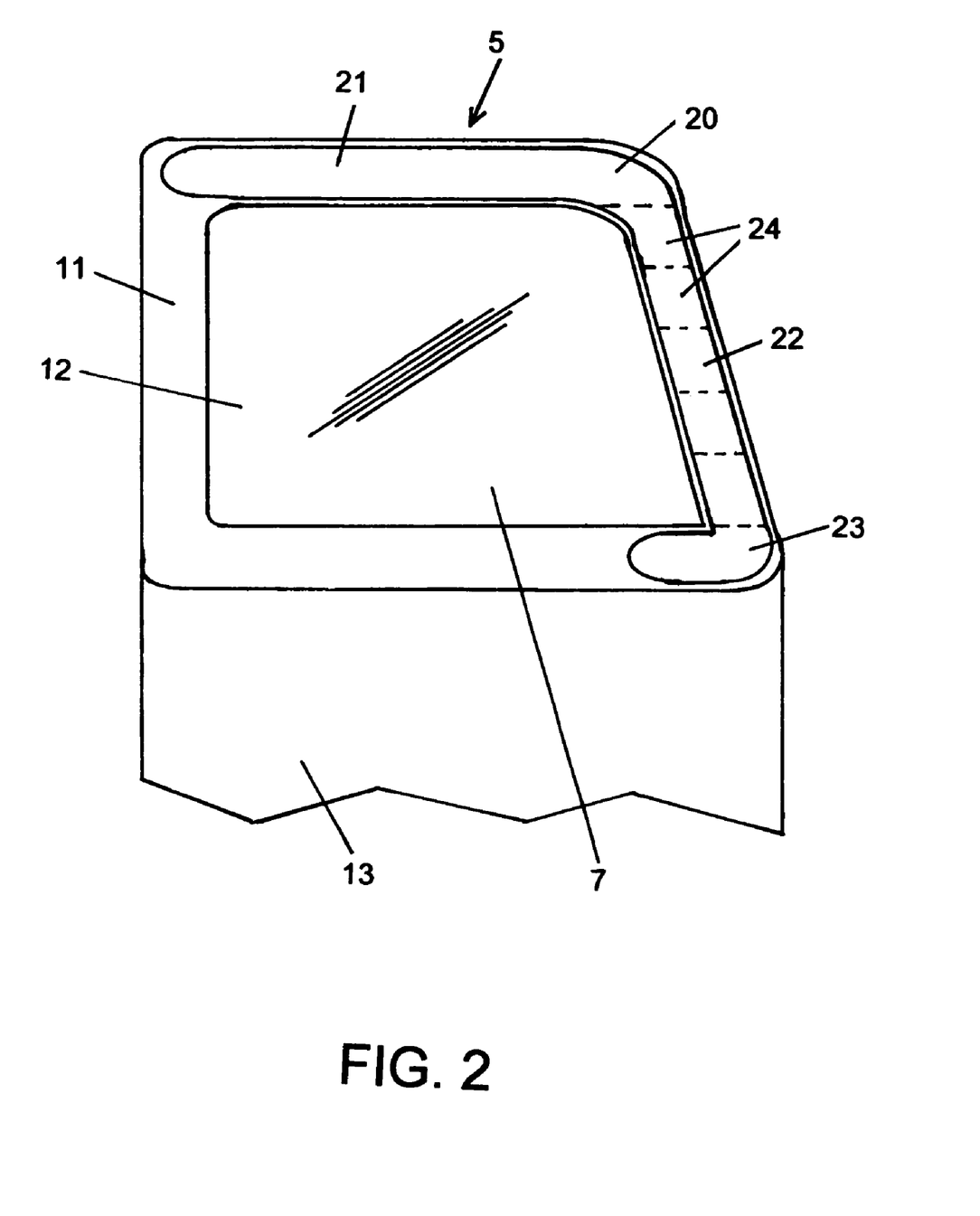
FIG. 2 is a diagrammatic side elevational view of a vehicle side window configuration according to the invention when viewed from the interior of the motor vehicle.

FIG. 2 is a diagrammatic side elevational view of a vehicle side window configuration according to the invention when viewed from the interior of the vehicle. A side window 5 of the motor vehicle 1 includes a window glass 7 in a window opening 12. The window glass 7 can be lowered and raised in order to open and close the side window 5. A boundary region 11 surrounds a peripheral region of the window opening 12. The boundary region 11 may be formed by any structural elements that surround the window opening 12. For example, the boundary region 11 may be a window frame 6 as part of a vehicle door. In case of a frameless window or in case the window frame 6 is substantially covered by structural elements of the vehicle chassis, then the boundary region 11 may also be made up from several different structural elements surrounding the window opening 12 such that the front portion of the boundary region 11 may be formed by the A-pillar 8 of the vehicle 1, the top portion of the boundary region 11 may be formed by the inside of the vehicle roof 2 adjacent to the window opening 12, the rear portion of the boundary region 11 may be formed by the B-pillar 40 of the vehicle and the bottom portion of the boundary region 11 may be formed by the top portion of an inside door panel 13.

A flat, touch-sensitive control element 20 is provided in the boundary region 11. The flat, touch-sensitive control element 20 detects a position corresponding to where an operator touches the control element 20. The flat control element 20 may be embodied as a position detection sensor that is constructed from a fabric. Such a position detection sensor is for example disclosed in International Publication No. WO 00/72239 A1. The flat control element 20 may also be a capacitive sensor that detects a contact with human skin due to a reduction of the sensor's capacitance when being touched. Such a capacitive sensor is for example disclosed in German Patent Application No. DE 102 06 968 A1.

The control element 20 is divided into three functional regions. The first region 21 of the control element 20 is an upper region of the control element 20 along the top of the side window 5. When the operator touches the first region 21 of the control element 20, then the window glass 7 is raised all the way to the top and the window is completely closed. The second region 22 of the control element 20 is provided between the upper region 21 of the control element 20 and a lower region 23 of the control element 20. The touch sensitivity of the second region 22 is position-dependent which means that the second region 22 of the control element 20 is conceptually divided into functional subregions 24 which is indicated by dashed lines in FIG. 2. When the operator touches the second region 22 of the control element 20, then the window glass 7 is raised or lowered such that the upper edge 30 of the window glass 7 is substantially at the same height as the point where the operator touched the second region 22 of the control element 20. The third region 23 of the control element 20 is the lower region of the control element 20 and is disposed below the second region 22 of the control element 20. When the operator touches the third region 23 of the control element 20, then the window glass 7 is lowered all the way down and the window is completely opened. The first, second, and third regions 21, 22, 23 of the control element 20 are shown as areas having a given width. Alternatively, the width of the first, second, and third regions 21, 22, 23 of the control element 20 may be reduced such that the first, second, and third regions 21, 22, 23 of the control element 20 essentially form a line that follows the peripheral outline of the window opening 12. Since the control element 20 is being touched frequently, it is preferred to provide the control element 20 as a stainresistant and waterrepellent fabric or surface and/or select a color, surface structure and mounting position for the control element 20 that will prevent the control element from looking unappealing or scuffed from frequent use.

The operation of the control element 20 is as follows. If the operator wants to open the window completely, then the operator touches the third region 23 of the control element 20. The touch-sensitive control element 20 detects the manual interaction in its third region 23 and causes a control of the window such that the window glass 7 is lowered all the way down and thus the window is completely opened. Similarly, if the operator wants to close the window completely, then the operator will touch the first region 21 of the control element 20 above the window opening 12. The control element 20 detects the touching in its first region 21 and causes the window glass 7 to be raised to its top position and thus the window is completely closed. In case the operator wishes to have the window partially open, then the operator will touch the control element 20 in its second region 22. Depending on where the operator touches the second region 22 of the control element 20, i.e. which subregion 24 along the longitudinal extension of the second region 22 the operator touches, the window glass 7 will be raised or lowered to a desired position. Preferably, the upper edge 30 of the window glass 7 will be substantially at the same level as the point where the operator touches the second region 22 of the control element 20. This operation provides an intuitive control for opening and closing the window because the operator simply touches a region along the periphery of the window opening 12 wherein the point that the operator touches corresponds to the desired position of the upper edge 30 of the window glass 7.

Additionally, the control operation allows a precise positioning of the window glass 7 without requiring the operator to repeatedly raise and lower the window glass 7 until a desired position is reached as is generally the case with conventional toggle switches.

Figure 3:
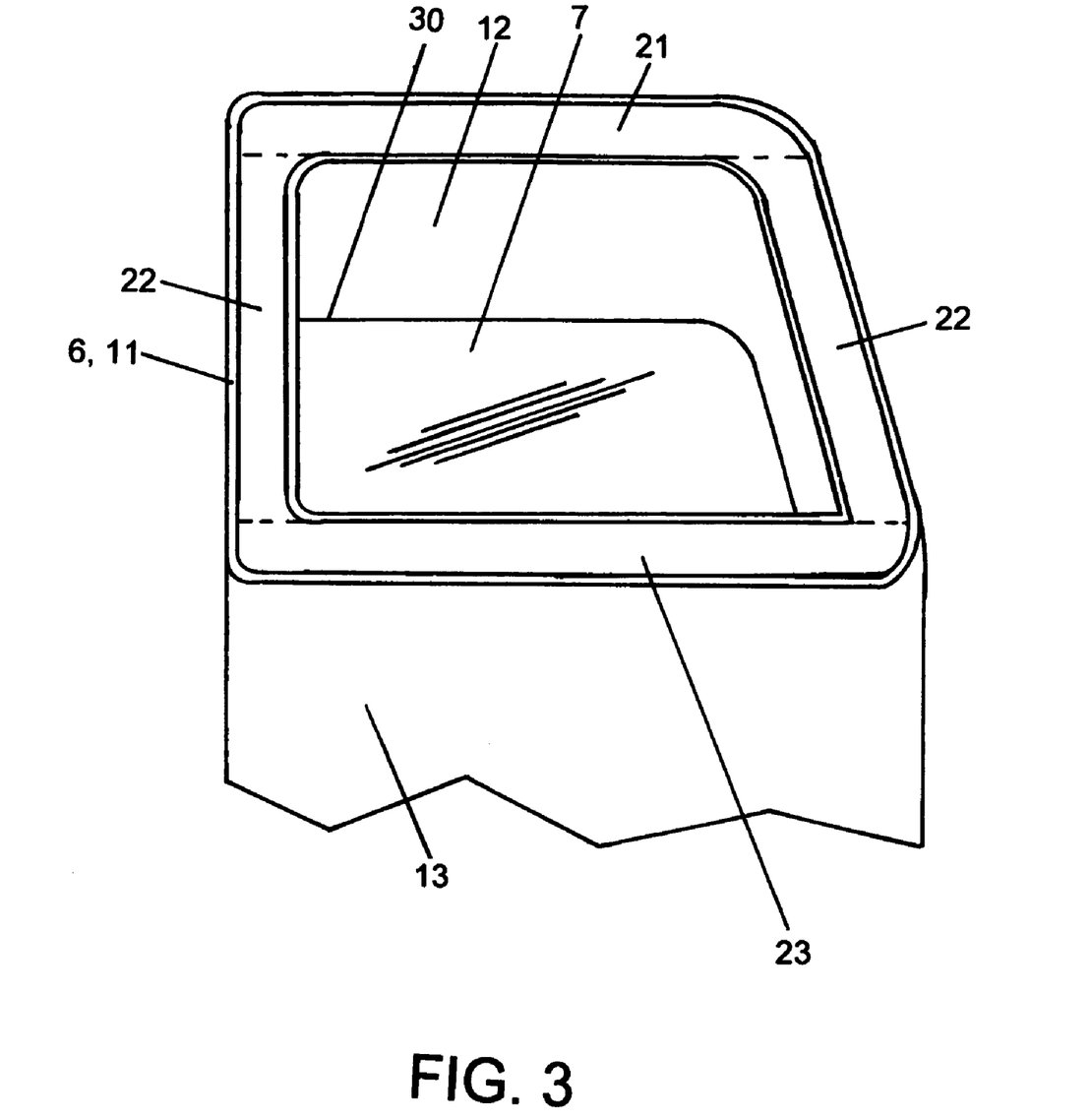
FIG. 3 is a diagrammatic side elevational view of a further embodiment of a side window configuration according to the invention.

FIG. 3 is a diagrammatic side elevational view of a further embodiment of a side window configuration according to the invention. The side window 5 includes a window glass 7 in a window opening 12. The window glass 7 is illustrated in a partially lowered position. A boundary region 11 surrounds a peripheral region of the window opening 12. As described above, the boundary region 11 may be formed by any structural elements that surround the window opening 12 such as a window frame 6 as shown in FIG. 3. Alternatively, the A-pillar of the vehicle may form the front part of the boundary region 11, the inside of the vehicle roof 2 adjacent to the window opening 12 may form the top part of the boundary region 11, the B-pillar of the vehicle may form the rear part of the boundary region 11 and a top portion of an inside door panel 13 may form the bottom part of the boundary region 11.

The touch-sensitive control element 20 is provided in the boundary region 11 around the window opening 12. The control element 20 extends all the way around the window opening 12 and has three functionally different control regions 21, 22, 23. As in the embodiment shown in FIG. 2, the first region 21 of the control element 20 is an upper region of the control element 20 along the top of the side window 5. However, unlike the embodiment shown in FIG. 2, the control element 20 of FIG. 3 has two second regions 22 between the upper region 21 of the control element 20 and a lower region 23 of the control element 20. The second regions 22 of the control element 20 are for example provided on the window frame 6 as shown in FIG. 3 or alternatively on the A-pillar 8 and the B-pillar 40, respectively. The third region 23 of the control element 20 is disposed below the second regions 22 of the control element 20. In the embodiment shown in FIG. 3, if the operator wants to open the window completely, then the operator touches the third region 23 of the control element 20. If the operator wants to close the window completely, then the operator will touch the first region 21 of the control element 20 above the window opening 12. If the operator wants to open or close the window only partly, then the operator can touch either one of the second regions 22 of the control element. Depending at which level, i.e. height, the operator touches one of the second regions 22, the window glass 7 will be raised or lowered. to that level. The upper edge 30 of the window glass 7 will be substantially at the same level as the point where the operator touched one of the second regions 22 of the control element 20. Providing the control element 20 entirely around the window opening 12 allows the operator to control the window by touching any point along the periphery of the window opening 12.

Figure 4:
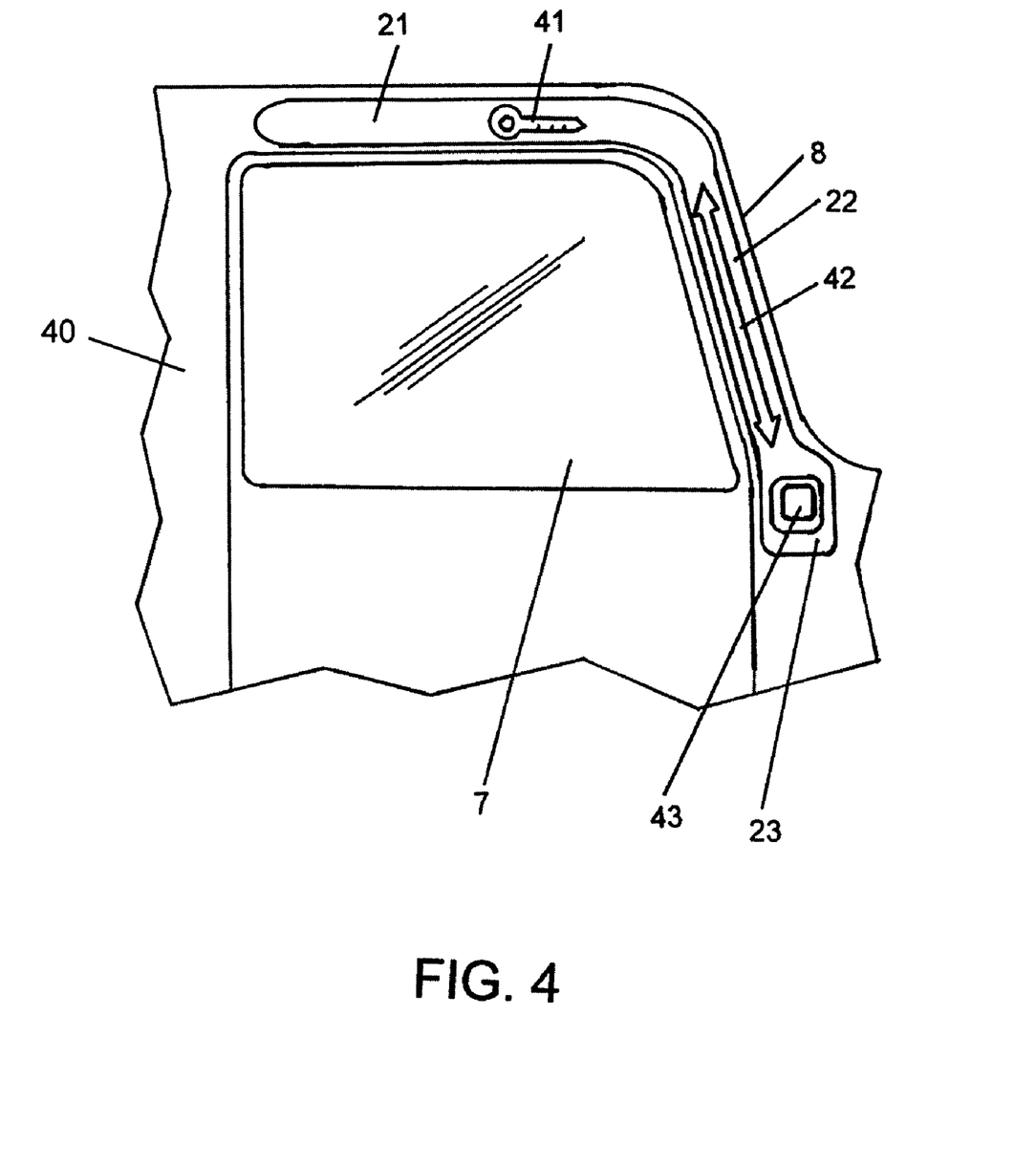
FIG. 4 is a diagrammatic side elevational view of a another embodiment of a side window configuration according to the invention.

FIG. 4 is a diagrammatic side elevational view of a further embodiment of a side window configuration according to the invention. The boundary region 11, which surrounds a peripheral region of the window opening 12, is formed by structural elements that surround the window opening 12. Here, the boundary region 11 is formed by the A-pillar 8, which forms the front part of the boundary region 11. The inside of the vehicle roof 2 adjacent to the window opening 12 forms the top part of the boundary region 11. The B-pillar 40 of the vehicle forms the rear part of the boundary region 11 and the top portion of an inside door panel 13 forms the bottom part of the boundary region 11.

The control element 20 of FIG. 4 is again subdivided in three functional regions 21, 22, 23. The first region 21 of the control element 20 is provided along the top of the side window opening 12 and serves for raising the window glass 7 all the way to the top and close the window completely. The second region 22 of the control element 20 is provided along the A-pillar 8. The third region 23 of the control element 20 is disposed at the bottom of the A-pillar 8 and serves to open the window completely. The operation of the control element 20 is the same as described above. If the window is to be opened completely, then the operator has to touch the third region 23 of the control element 20. If the window is to be closed completely, then the operator has to touch the first region 21 of the control element 20. If the window is to be partially opened, then the operator has to touch the second region 22 of the control element 20. The upper edge 30 of the window glass 7 will be substantially at the same level as the point where the operator touches the second region 22 of the control element 20. The embodiment illustrated in FIG. 4 is advantageous in case an installation of the control element 20 on the window frame is difficult or results in an inconvenient operation or in case of a frameless window.

In order to improve the intuitive operation, it is advantageous to label the various control regions. The labeling is preferably done by using pictograms that are easy to understand. In FIG. 4, the first region 21 of the control element 20 which serves for closing the window completely is labeled with a pictogram of a key 41 in order to indicate that this control region 21 of the control element 20 closes the window. The second region 22 of the control element 20 is labeled with a double arrow 42 which is oriented in an up and down direction in order to indicate that the second region 22 of the control element 20 is used to raise and lower the window. The third region 23 of the control element 20 is labeled with a pictogram 43 that indicates a completely opened window. The pictograms are preferably positioned either in the respective control regions or directly adjacent to the control regions.

Figure 5:
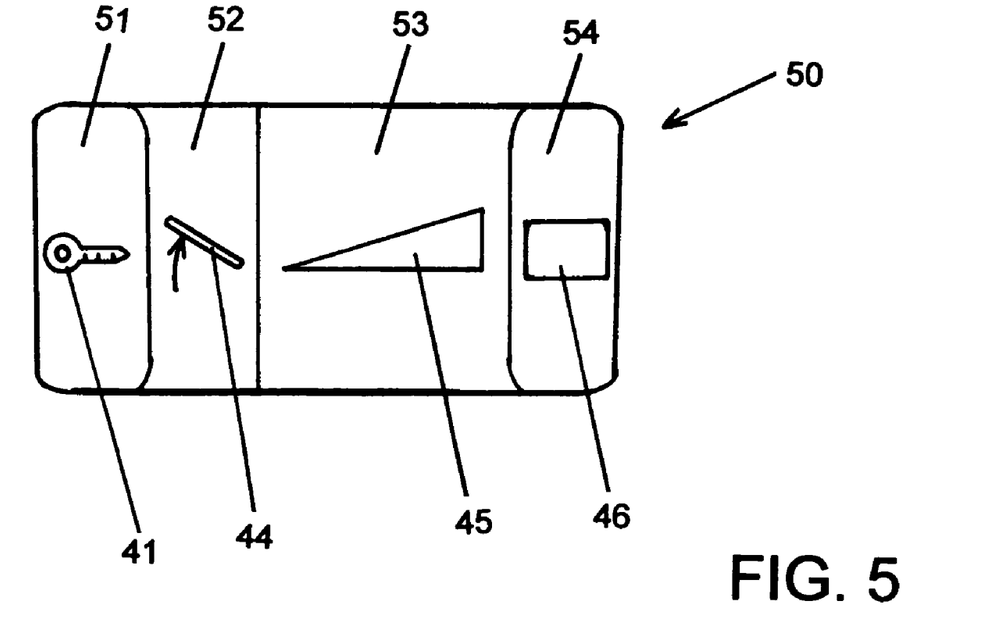
FIG. 5 is a diagrammatic plan view of a control element for controlling a roof panel of a vehicle in accordance with the invention.

FIG. 5 is a diagrammatic plan view of a control element 50 for a roof panel 4 of a vehicle. The control element 50 is a substantially flat element. In order to improve the intuitive operation of the control element 50, the control element 50 is shaped such that the operator will recognize the control element as a representation of the sliding roof. In this case, the control element 50 has a substantially rectangular shape which the operator will recognize as a representation of the substantially rectangular roof panel 4. In order to further improve the intuitive operation of the control element, it is preferred to mount the control element 50 in the vicinity of the roof opening. The control element 50 can for example be mounted on the inside of the vehicle roof close to the upper edge of the windshield. The color and surface structure of the control element 50 is preferably adapted to the roof liner of the vehicle in order to make the control element 50 aesthetically pleasing.

The sliding roof can be controlled to be in a completely closed position, in a tilted position, in a partially opened position and in a completely opened position. The control element 50 is divided into several regions such that each region corresponds to a corresponding position of the roof panel 4. A first region 51 of the control element 50 is used to completely close the sliding roof. A second region 52 is used to tilt the roof panel 4. A third region 53 is used to partially open or close the roof panel 4 wherein the operator can control the degree of opening of the sliding roof by touching a corresponding area or subregion of the third region 53 of the control element. A fourth region 54 of the control element 50 is used to completely open the sliding roof.

The control element 50 for the sliding roof operates as follows. If the sliding roof is to be closed completely, then the operator has to touch the first region 51 of the control element 50. The control element 50 is sensitive to manual interaction, for example it detects a change in pressure, conductivity or capacitance, and detects the manual interaction in its first region 51 and causes a control of the sliding roof such that the sliding roof is closed completely. If the operator wants to tilt the roof panel 4 of the sliding roof, then this can be done by touching the second region 52 of the control element 50. If the sliding roof is to be opened completely, then the operator will touch the fourth region 54 the control element 50. In case the operator wishes to have the sliding roof partially open, then the operator will touch the third region 53 of the control element 50. Depending on where the operator touches the third region 53 of the control element 50, the sliding roof will be opened or closed to a desired degree. Preferably, the position of the leading edge of the roof panel 4 in the roof opening 3 will substantially correspond to the point where the operator touches the third region 53 of the control element 50 along its longitudinal axis. Specifically, if the operator touches the third region 53 of the control element 50 close to the fourth region 54, then the sliding roof will open almost entirely and conversely, if the operator touches the third region 53 of the control element at a point close to the second region 52 of the control element, then the sliding roof will close almost entirely. The third region 53 of the control element 50 allows the operator to precisely adjust the degree of opening with a single touch. The control element 50 is preferably configured such that the sliding roof moves back and forth simultaneously with the operator's finger sliding back and forth in the third region 53 of the control element 50.

The control element 50 is preferably mounted such that the orientation of the various control regions 51, 52, 53, 54 of the control element 50 correspond to respective positions of the roof panel 4. In other words, the control element 50 is preferably mounted such that the first region 51 of the control element is oriented toward the front of the vehicle and the fourth region 54 of the control element 50 is oriented toward the rear of the vehicle. The third region 53 of the control element 50 adjusts the degree of opening of the sunroof such that the roof panel 4 moves toward the front of the vehicle as the operator touches points of the third region 53 that are further forward and conversely the roof panel 4 moves toward the rear of the vehicle as the operator touches points of the third region 53 that are further rearward. This allows an intuitive control for opening and closing the sliding roof or sunroof because the movement direction and the desired position of the roof panel 4 correspond to the location on the control element 50 that the operator touches.

In order to further improve the intuitive operation of the sliding roof, the respective control regions of the control element can be labeled with pictograms. The first region 51 of the control element which is used to completely close the sliding roof is labeled with a pictogram of a key 41. The second region 52 which is used to tilt the sliding roof is labeled with a pictogram 44 indicating a tilted roof panel. The third region 53 which is used to adjust the degree of opening or closing of the sliding roof is labeled with a wedge-shaped pictogram 45 indicating the possibility of adjusting the degree of opening of the sliding roof. The fourth region 54 of the control element 50, which is used to completely open the sliding roof, is labeled with a pictogram 46 that indicates an open sliding roof.

Figure 6:
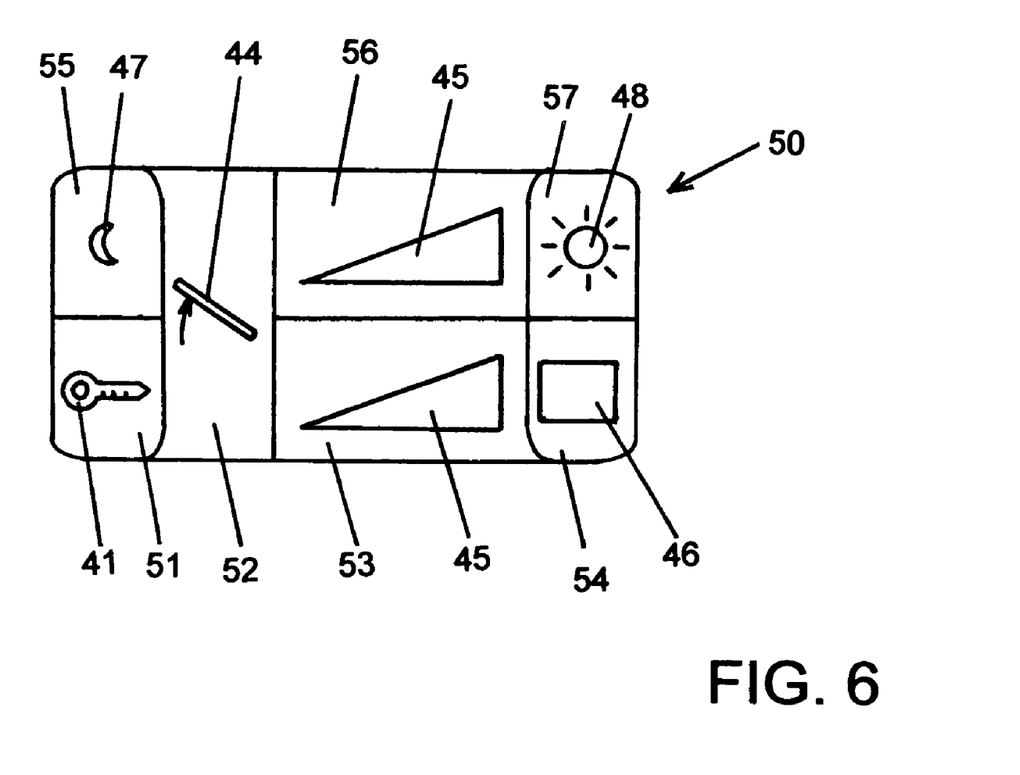
FIG. 6 is a diagrammatic plan view of a control element for controlling two functions of a roof panel in accordance with the invention.

FIG. 6 is a diagrammatic plan view of a control element 50 for a sliding roof of a vehicle that controls two functions of the sliding roof. In this case the sliding roof has a roof panel 4 whose degree of optical transparency or darkening can be adjusted by adjusting the optical absorbency or reflectivity of the roof panel 4. The control element 50 is configured to control the position of the roof panel 4 as well as the optical properties of the roof panel 4.

With respect to controlling the position of the sliding roof panel 4, the control element 50 of FIG. 6 operates just like the control element of FIG. 5. The roof panel 4 can be in a completely closed position, in a tilted position, in a partially opened position and in a completely opened position. In addition, the transparency of the roof panel 4 can be controlled by adjusting optical properties such as the absorbency or the reflectivity.

The control element 50 is divided into regions such that each region corresponds to either a corresponding position of the roof panel 4 or a degree of transparency of the roof panel 4. The first region 51 of the control element 50 is used to completely close the sliding roof, the second region 52 is used to tilt the roof panel 4. The third region 53 is used to partially open or close the sliding roof as described with reference to the control element of FIG. 5. The fourth region 54 of the control element 50 is used to completely open the sliding roof.

A fifth region 55 of the control element 50 allows to make the roof panel as dark as possible by increasing its absorbency or reflectivity. A sixth region 56 allows adjusting the degree of darkening such that the roof panel 4 gets darker as the operator touches points of the sixth region 56 that are closer to the fifth region 55 and conversely the roof panel 4 gets lighter, i.e. more transparent, as the operator touches points of the sixth region 56 that are closer to a seventh region 57. The seventh region 57 of the control element 50 is used to make the sunroof as light or transparent as possible.

With respect to adjusting the position of the roof panel, the control element 50 of FIG. 6 operates just like the control element of FIG. 5. The various regions 51, 52, 53, 54 of the control element 50 are used for that purpose. The control of the optical properties of the sliding roof is intuitively clear because the fifth region 55 for completely darkening the roof panel 4 is adjacent to the first region 51 of the control element for completely closing the sliding roof. The seventh region 57 for making the sliding roof as transparent as possible is adjacent to the fourth region 54 of the control element 50 for completely opening the sliding roof. The regions 53 and 56 for adjusting the degree of opening and darkening the sliding roof are also adjacent to one another. As described above, the control element 50 is mounted such that the orientation of the various control regions of the control element corresponds to the positions of the roof panel 4, which means that the control element 50 is preferably mounted such that the first and fifth regions 51, 55 of the control element are oriented toward the front of the vehicle 1 and the fourth and seventh regions 54, 57 of the control element 50 are oriented toward the rear of the vehicle 1.

The intuitive operation of the sliding roof is improved by labeling the respective control regions of the control element 50 with pictograms. The control regions of the control element 50 for opening, closing and tilting the sunroof are labeled with pictograms 41, 44, 45, 46 as described with reference to FIG. 5. The control regions 55, 56, 57 of the control element 50 for changing the darkness or optical transparency of the sunroof are labeled corresponding to their function. The fifth region 55 of the control element 50 which is used to switch the sliding roof to its minimum transparency is labeled with a pictogram of a moon 47. The sixth region 56 of the control element 50 which is used to adjust the degree of absorbency/reflectivity of the sunroof is labeled with a wedge-shaped pictogram 45 indicating the possibility of adjusting the degree of darkening. The seventh region 57 of the control element 50, which is used to switch the sunroof to its maximum transparency, is labeled with a pictogram of a sun 48.

Figure 7:
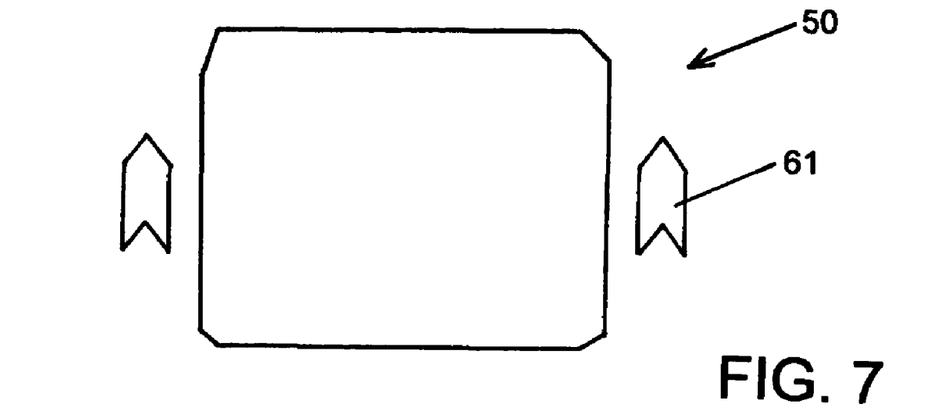
FIGS. 7 to 9 are diagrammatic plan views of further embodiments of control elements for controlling a roof panel in accordance with the invention.
Figure 8:
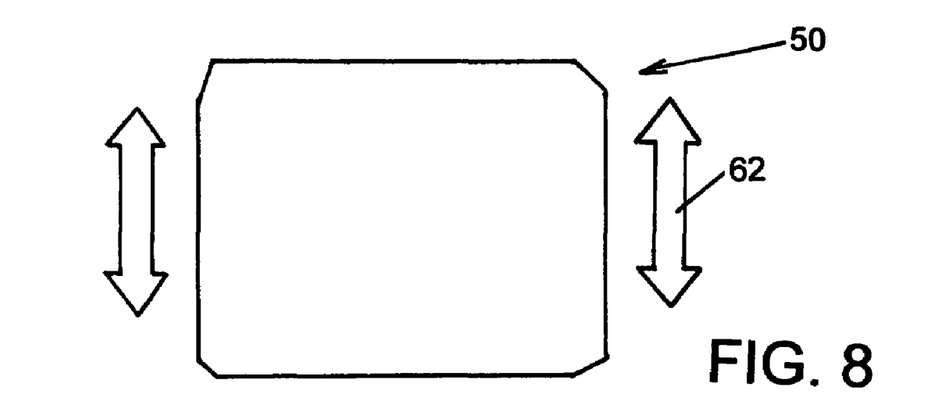
Figure 9:
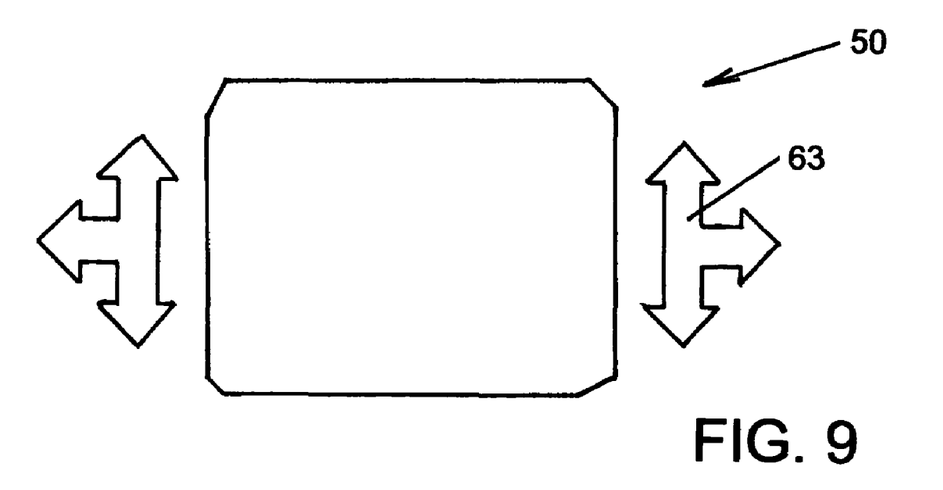

FIGS. 7 to 9 are diagrammatic plan views of a further embodiments of control elements 50 for controlling a sliding roof. In this case, arrows 61, 62 are used to indicate the actuation for opening and closing of a sliding roof and arrows 63 are used to indicate the actuation for opening/closing the sliding roof and moving the roof panel 4 up and down.

We claim:

1. A vehicle configuration, comprising:
a vehicle component configured to move between a first position and a second position;
a control element for controlling said vehicle component, said control element having a substantially flat, touch-sensitive first region, a substantially flat, touch-sensitive second region, and a substantially flat, touch-sensitive third region;
said control element being configured to generate a control signal for moving said vehicle component into the first position in response to said first region of said control element being touched;
said second region of said control element having subregions for allowing a variable adjustment of said vehicle component into intermediate positions between the first position and the second position, said control element being configured to generate a control signal for moving said vehicle component into a given intermediate position between the first position and the second position in response to a given one of said subregions of said second region of said control element being touched;
said subregions of said second region of said control element being positioned with respect to one another such that adjacent ones of said subregions of said second region of said control element when being touched cause said vehicle component to move into corresponding adjacent intermediate positions between the first position and the second position;
said control element being configured to generate a control signal for moving said vehicle component into the second position in response to said third region of said control element being touched;
said vehicle component having a peripheral region;
said first, second and third regions of said control element being disposed adjacent to said vehicle component and extending along said peripheral region of said vehicle component when said vehicle component is in the first position;
said first, second and third regions of said control element being flexible and configured to lie flat against a curved surface;
said vehicle component being a window glass configured to open and close a window opening by moving between the first position corresponding to a closed position and the second position corresponding to an opened position;
said first region of said control element extending along at least a portion of an upper edge of said window opening;
said second region of said control element extending substantially entirely along a side edge of said window opening; and
said third region of said control element being disposed adjacent to a lower edge of said window opening.

2. The vehicle configuration according to claim 1, including:
a window frame, said window frame holds said window glass and defines said window opening; and
at least said first and said second region of said control element are disposed on said window frame.

3. The vehicle configuration according to claim 1, wherein said first, second and third regions form a substantially flat continuous band circling entirely around said window opening.

4. The vehicle configuration according to claim 1, including:
a vehicle roof portion disposed adjacent to said window opening; and
said first region of said control element being disposed above said window opening on an inner side of said vehicle roof portion.

5. The vehicle configuration according to claim 1, including:
a vehicle A-pillar disposed adjacent to said window opening; and
said second region of said control element being disposed on said vehicle A-pillar.

6. The vehicle configuration according to claim 1, including:
a vehicle A-pillar disposed adjacent to said window opening; and
said vehicle A-pillar having a bottom region and said third region of said control element being disposed at said bottom region of said vehicle A-pillar.

7. The vehicle configuration according to claim 1, including a pictogram disposed on each of said first, second and third regions of said control element, said pictogram indicating a control function of a respective one of said first, second and third regions of said control element.

8. The vehicle configuration according to claim 1, wherein said control element includes a flexible fabric configured to lie flat against a curved surface and said substantially flat, touch-sensitive first, second and third regions of said control element are formed by said flexible fabric.

* * * * *